United States Patent
Nagel et al.

(10) Patent No.: US 9,020,946 B2
(45) Date of Patent: Apr. 28, 2015

(54) SYSTEM AND METHOD FOR COMPILATION OF QUICKBOOKS ACCOUNTS DATA

(75) Inventors: Charles Brenton Nagel, Dale, TX (US); Jay Otterbein, Austin, TX (US)

(73) Assignee: Qvinci Software, LLC, Austin, TX (US)

( * ) Notice: Subject to any disclaimer, the term of this patent is extended or adjusted under 35 U.S.C. 154(b) by 360 days.

(21) Appl. No.: 12/834,791

(22) Filed: Jul. 12, 2010

(65) Prior Publication Data
US 2012/0011123 A1    Jan. 12, 2012

(51) Int. Cl.
G06F 17/30    (2006.01)
G06Q 40/00    (2012.01)
G06Q 10/10    (2012.01)

(52) U.S. Cl.
CPC ............ *G06Q 40/00* (2013.01); *G06F 17/3033* (2013.01); *G06Q 10/10* (2013.01)

(58) Field of Classification Search
CPC combination set(s) only.
See application file for complete search history.

(56) References Cited

U.S. PATENT DOCUMENTS

| | | | |
|---|---|---|---|
| 6,141,664 A | 10/2000 | Boothby | |
| 6,411,938 B1 | 6/2002 | Gates | |
| 6,751,663 B1 | 6/2004 | Farrell et al. | |
| 6,785,689 B1 | 8/2004 | Daniel | |
| 7,401,101 B2 | 7/2008 | Hild | |
| 7,490,108 B2 | 2/2009 | Bruun | |
| 7,580,884 B2 | 8/2009 | Cook | |
| 2002/0052791 A1 | 5/2002 | Defede | |
| 2004/0199369 A1* | 10/2004 | Freidman et al. | 703/19 |
| 2005/0086199 A1 | 4/2005 | Champagne et al. | |
| 2006/0064428 A1* | 3/2006 | Colaco et al. | 707/101 |
| 2006/0193264 A1 | 8/2006 | Bonar et al. | |
| 2007/0101437 A1 | 5/2007 | Yamamoto et al. | |
| 2008/0222189 A1 | 9/2008 | Ovanesyan et al. | |
| 2009/0037356 A1 | 2/2009 | Rothstein et al. | |
| 2009/0201294 A1* | 8/2009 | Hayes | 345/440 |
| 2009/0234885 A1* | 9/2009 | Yotsukura | 707/104.1 |
| 2009/0313208 A1* | 12/2009 | Helfman | 707/2 |
| 2010/0107085 A1 | 4/2010 | Chadwick et al. | |
| 2010/0179940 A1 | 7/2010 | Gilder | |

OTHER PUBLICATIONS

International Search Report and Written Opinion dated Oct. 6, 2011 for International Application No. PCT/US2011/043693, International Filing Date: Jul. 12, 2011 consisting of 6-pages.
Running Quickbooks 2007 Premier Editions by Kathy Ivens, 10 Pages.
Need Help Understanding Import Options by Derek Atkinds, Jun. 5, 2008, Posted at GnuCash SVN/CVS and Mail Archive Server, 6 Pages.
Can I Merge 2 General Ledger Accounts? by Chief Mechanic, Sep. 5, 2010, GL & Journal Entries, http://www.qbgarage.com, 3 Pages.
Quickbooks 2007, The Official Guide for QuickBooks Pro Users by Kathy Ivens, 3 Pages.
International Search Report and Written Opinion dated Feb. 21, 2012 for PCT/US2011/060350 filed Nov. 11, 2011, 11 Pages.

\* cited by examiner

*Primary Examiner* — Syed Hasan
(74) *Attorney, Agent, or Firm* — Gazdzinski & Associates, PC

(57) ABSTRACT

Embodiments include a method of aggregating data from a plurality of QuickBooks (QB) files that may be in physically separate locations, and having at least one account name in common. In one embodiment, the method includes, assigning a different parent account identification (ID) number to each differently named parent account. The method includes creating an entry in a hash table for each parent account ID, the contents of the entry being a collection of rows including a row for each different sub account of the parent account, wherein data for multiple instances of like named parent accounts are aggregated, the key of the entry in the hash table being the parent account ID.

11 Claims, 9 Drawing Sheets

| KEY=1 | | |
|---|---|---|
| ACCOUNT ID | ACCOUNT NAME | PARENT ACCOUNT ID |
| 3 | HYATT | 1 |
| 5 | MOTEL 6 | 1 |

| KEY=2 | | |
|---|---|---|
| ACCOUNT ID | ACCOUNT NAME | PARENT ACCOUNT ID |
| 4 | HYATT | 2 |
| 6 | MOTEL 6 | 2 |

| KEY=5 | | |
|---|---|---|
| ACCOUNT ID | ACCOUNT NAME | PARENT ACCOUNT ID |
| 7 | DALLAS | 5 |
| 9 | HOUSTON | 5 |

| KEY=6 | | |
|---|---|---|
| ACCOUNT ID | ACCOUNT NAME | PARENT ACCOUNT ID |
| 8 | SAN ANTONIO | 6 |
| 10 | HOUSTON | 6 |

| KEY=11 | | |
|---|---|---|
| ACCOUNT ID | ACCOUNT NAME | PARENT ACCOUNT ID |
| 12 | PF CHANG'S | 11 |
| 13 | SUBWAY | 11 |

| KEY=14 | | |
|---|---|---|
| ACCOUNT ID | ACCOUNT NAME | PARENT ACCOUNT ID |
| 15 | PF CHANG'S | 14 |
| 16 | SUBWAY | 14 |

| KEY=17 | | |
|---|---|---|
| ACCOUNT ID | ACCOUNT NAME | PARENT ACCOUNT ID |
| 19 | BUS | 17 |
| 21 | PLANE | 17 |
| 23 | CAR | 17 |

| KEY=18 | | |
|---|---|---|
| ACCOUNT ID | ACCOUNT NAME | PARENT ACCOUNT ID |
| 20 | TRAIN | 18 |
| 22 | PLANE | 18 |
| 24 | CAR | 18 |

| TABLE A | 1-Jan | 2-Jan | 3-Jan | 4-Jan | 5-Jan |
|---|---|---|---|---|---|
| Hotel | | | | | |
|   Hyatt | 500 | 1500 | 0 | 200 | 300 |
|   Motel 6 | | | | | |
|     Dallas | 50 | 0 | 0 | 100 | 50 |
|     Houston | 100 | 40 | 0 | 40 | 50 |
| Restaurants | | | | | |
|   PF Chang's | 50 | 140 | 100 | 50 | 100 |
|   Subway | 10 | 20 | 20 | 0 | 0 |
| Transportation | | | | | |
|   Car | 10 | 20 | 20 | 10 | 50 |
|   Bus | 10 | 30 | 10 | 10 | 90 |
|   Plane | 200 | 400 | 1000 | 500 | 400 |

FIG. 1A

| TABLE B | 1-Jan | 2-Jan | 3-Jan | 4-Jan | 5-Jan |
|---|---|---|---|---|---|
| Hotel | | | | | |
|   Hyatt | 500 | 1500 | 0 | 200 | 300 |
|   Motel 6 | | | | | |
|     San Antonio | 50 | 0 | 0 | 100 | 50 |
|     Houston | 100 | 40 | 0 | 40 | 50 |
| Restaurants | | | | | |
|   PF Chang's | 50 | 140 | 100 | 50 | 100 |
|   Subway | 10 | 20 | 20 | 0 | 0 |
| Transportation | | | | | |
|   Car | 10 | 20 | 20 | 10 | 50 |
|   Train | 10 | 30 | 10 | 10 | 90 |
|   Plane | 200 | 400 | 1000 | 500 | 400 |

FIG. 1B

| TABLE C | 1-Jan | 2-Jan | 3-Jan | 4-Jan | 5-Jan |
|---|---|---|---|---|---|
| Hotel | | | | | |
|   Hyatt | 1000 | 3000 | 0 | 400 | 600 |
|   Motel 6 | | | | | |
|     Dallas | 50 | 0 | 0 | 100 | 50 |
|     San Antonio | 50 | 0 | 0 | 100 | 50 |
|     Houston | 200 | 80 | 0 | 80 | 100 |
| Restaurants | | | | | |
|   PF Changs | 100 | 280 | 200 | 100 | 200 |
|   Subway | 20 | 40 | 40 | 0 | 0 |
| Transportation | | | | | |
|   Car | 20 | 40 | 40 | 20 | 100 |
|   Train | 10 | 30 | 10 | 10 | 90 |
|   Bus | 10 | 30 | 10 | 10 | 90 |
|   Plane | 400 | 800 | 2000 | 1000 | 800 |

FIG. 1C

| COMPANY | ACCOUNT ID | ACCOUNT NAME | PARENT ACCOUNT ID |
| --- | --- | --- | --- |
| A | 1 | HOTEL | NULL |
| B | 2 | HOTEL | NULL |
| A | 3 | HYATT | 1 |
| B | 4 | HYATT | 2 |
| A | 5 | MOTEL 6 | 1 |
| B | 6 | MOTEL 6 | 2 |
| A | 7 | DALLAS | 5 |
| B | 8 | SAN ANTONIO | 6 |
| A | 9 | HOUSTON | 5 |
| B | 10 | HOUSTON | 6 |
| A | 11 | RESTAURANTS | NULL |
| A | 12 | PF CHANG'S | 11 |
| A | 13 | SUBWAY | 11 |
| B | 14 | RESTAURANTS | NULL |
| B | 15 | PF CHANG'S | 14 |
| B | 16 | SUBWAY | 14 |
| A | 17 | TRANSPORTATION | NULL |
| B | 18 | TRANSPORTATION | NULL |
| A | 19 | BUS | 17 |
| B | 20 | TRAIN | 18 |
| A | 21 | PLANE | 17 |
| B | 22 | PLANE | 18 |
| A | 23 | CAR | 17 |
| B | 24 | CAR | 18 |

FIG. 3

| COLLECTION OF PARENT ACCOUNTS, EXISTS OUTSIDE OF THE HASH TABLE | | |
|---|---|---|
| ACCOUNT ID | ACCOUNT NAME | PARENT ACCOUNT ID |
| 1 | HOTEL | NULL |
| 2 | HOTEL | NULL |
| 11 | RESTAURANTS | NULL |
| 14 | RESTAURANTS | NULL |
| 17 | TRANSPORTATION | NULL |
| 18 | TRANSPORTATION | NULL |

FIG. 4

| KEY=1 | | |
|---|---|---|
| ACCOUNT ID | ACCOUNT NAME | PARENT ACCOUNT ID |
| 3 | HYATT | 1 |
| 5 | MOTEL 6 | 1 |
| KEY=2 | | |
| ACCOUNT ID | ACCOUNT NAME | PARENT ACCOUNT ID |
| 4 | HYATT | 2 |
| 6 | MOTEL 6 | 2 |
| KEY=5 | | |
| ACCOUNT ID | ACCOUNT NAME | PARENT ACCOUNT ID |
| 7 | DALLAS | 5 |
| 9 | HOUSTON | 5 |
| KEY=6 | | |
| ACCOUNT ID | ACCOUNT NAME | PARENT ACCOUNT ID |
| 8 | SAN ANTONIO | 6 |
| 10 | HOUSTON | 6 |
| KEY=11 | | |
| ACCOUNT ID | ACCOUNT NAME | PARENT ACCOUNT ID |
| 12 | PF CHANG'S | 11 |
| 13 | SUBWAY | 11 |
| KEY=14 | | |
| ACCOUNT ID | ACCOUNT NAME | PARENT ACCOUNT ID |
| 15 | PF CHANG'S | 14 |
| 16 | SUBWAY | 14 |
| KEY=17 | | |
| ACCOUNT ID | ACCOUNT NAME | PARENT ACCOUNT ID |
| 19 | BUS | 17 |
| 21 | PLANE | 17 |
| 23 | CAR | 17 |
| KEY=18 | | |
| ACCOUNT ID | ACCOUNT NAME | PARENT ACCOUNT ID |
| 20 | TRAIN | 18 |
| 22 | PLANE | 18 |
| 24 | CAR | 18 |

FIG. 5

SYSTEM AND METHOD FOR COMPILATION OF QUICKBOOKS ACCOUNTS DATA

FIELD

This written description is in the field of QuickBooks (QB) data processing.

BRIEF DESCRIPTION OF THE DRAWINGS

Aspects of embodiments will become apparent upon reading the following detailed description and upon reference to the accompanying drawings in which like references may indicate similar elements:

FIG. 1A depicts an expense table for a first company A;

FIG. 1B depicts an expense table for a second company B;

FIG. 1C depicts an expense table that aggregates the expense data from company A and company B;

FIG. 3 depicts a collection of the data from companies A and B obtained from using Structure Query Language (SQL);

FIG. 4 depicts a table of parent accounts;

FIG. 5 depicts a collection of rows in a hash table for each parent account and each sub accounts and each sub sub account for the data from companies A and B;

DETAILED DESCRIPTION

Figure 2A:
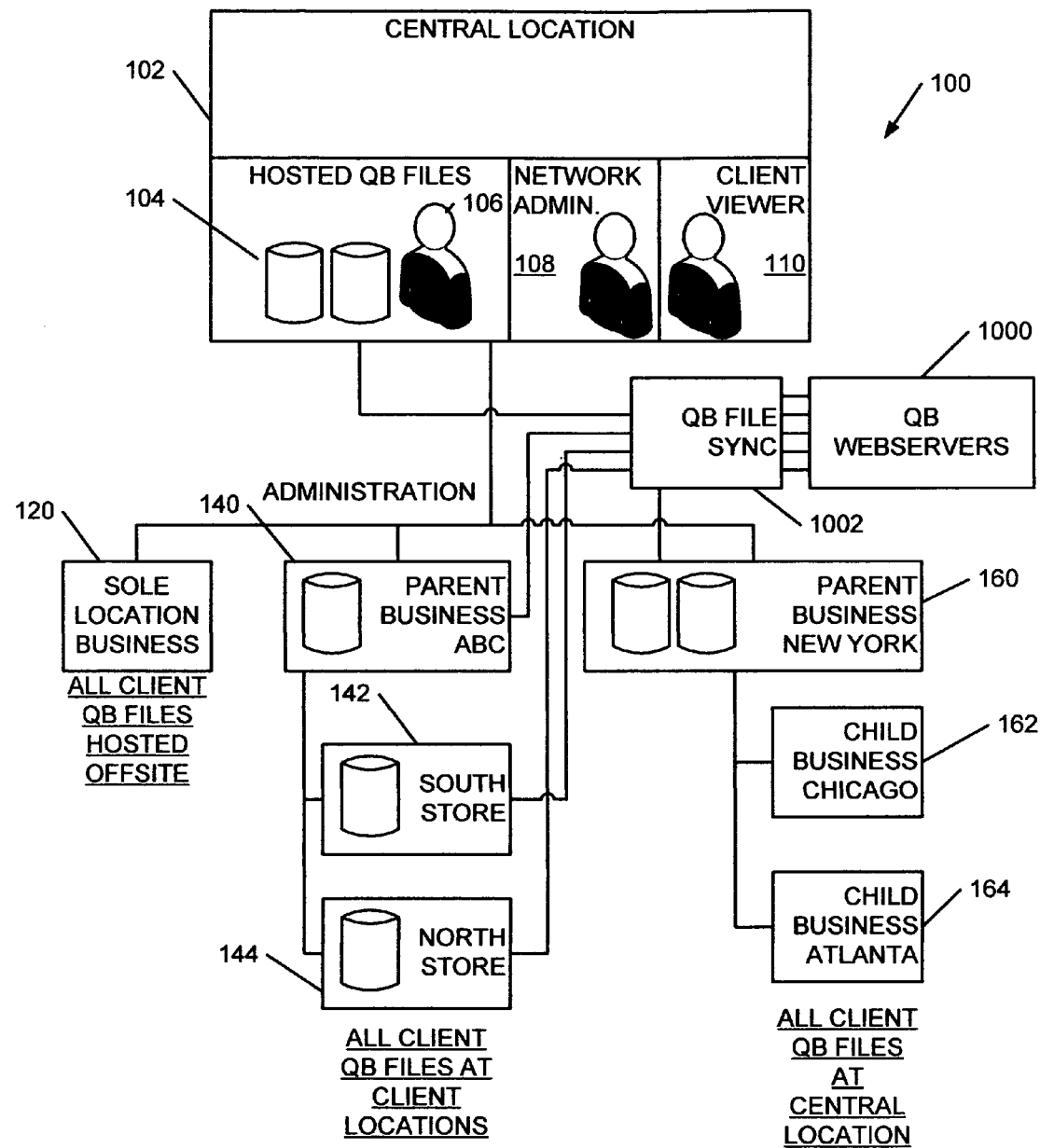
FIG. 2A depicts a network and server for aggregating QB data from computers of companies and sub companies.

The following is a detailed description of embodiments depicted in the accompanying drawings. The amount of detail offered is not intended to limit the anticipated variations of embodiments; but, on the contrary, the intention is to cover modifications, equivalents, and alternatives falling within the scope of the appended claims. The detailed descriptions below are designed to make such embodiments obvious to a person of ordinary skill in the art.

Embodiments include a method of aggregating data from a plurality of QuickBooks (QB) files that may be in physically separate locations, and having at least one account name in common. In one embodiment, the method includes, assigning a different parent account identification (ID) number to each differently named parent account. The method includes creating an entry in a hash table for each parent account ID, the contents of the entry being a collection of rows including a row for each different sub account of the parent account, wherein data for multiple instances of like named parent accounts are aggregated, the key of the entry in the hash table being the parent account ID.

Another embodiment is a QuickBooks (QB) data aggregation system having a web server connected to a network of computers having QB files stored in a database format at each computer. The server has a memory to store data obtained from the QB files of the network of computers. The web server also has a processor configured to identify like-named parent accounts in the QB files. For each like-named parent account, the processor is configured to aggregate the data of like-named sub accounts of the parent account from each computer. The processor is further configured to store the aggregated data in a hash table. Each entry in the hash table corresponds to data of a different-named sub account, each hash table entry having a collection of rows, a row for each sub account of the parent account, and having columns of data associated with each sub account.

Another embodiment is a tangible storage medium having instructions that when executed by a computer cause the computer to aggregate data of a plurality of QuickBooks (QB) files. The instructions cause the computer to obtain QB data from each of a plurality of computers in a network, the data being organized into one or more parent accounts. The instructions further cause the computer to aggregate the data from like-named sub accounts for each parent account. The instructions further cause the computer to form a collection in a hash table for each differently-named parent account, an entry including aggregate data of like-named sub accounts associated with the parent account name.

Small businesses and accountants need visibility and usability of financial and operational data from remote locations. QuickBooks™ (QB) by Intuit™ currently owns roughly 87% of the small business accounting software installed at computers of companies distributed geographically. However, the QuickBooks software does not allow for aggregation and consolidation of disparate files. Only their Enterprise™ solution supports this. However, the Enterprise solution involves difficult processes and only applies to Enterprise-formatted company files. Most QuickBooks users do not run Enterprise due to a lack of need for the features it provides and because of its high cost. If a company has multiple QuickBooks files with users needing to access data contained in more than one QB file, one option is to open each QB file, export a large number of reports to Microsoft™ Excel™ and then map the account names of each QB file, combine the data, create custom analytics to measure results, create charts and graphs for better understanding and transmit the results to users. This process is extremely manually intensive and in many cases prohibitive due to the large number of QB files that may exist. For instance, a franchise might have 50, 200 or even 30,000 QB files in its network of businesses located across the globe.

Further complicating the process is the fact that versions of QB are not backward compatible. For example, if a user runs QB 2008 Premier™, then opening a file in a later version of QB will convert the file to the later version and the file can then not be opened using the earlier version of QB.

FIG. 1A shows a table of expenses for a company A. There is a row for each parent account: Hotel, Restaurants, and Transportation. For each parent account there is a row for each sub account of the parent account. For example, the parent account, Hotel, has two sub accounts: Hyatt and Motel 6. In this example, the sub account, Motel 6, has two sub sub accounts: Dallas and Houston. Also, the table of FIG. 1A shows five columns containing the corresponding data associated with each sub account and each sub sub account. Although only a few parent accounts, sub accounts, and sub sub accounts are shown, more or less of these accounts may be given for a company QB file. Further, some company files may have sub sub sub accounts, or even deeper levels of sub accounts.

FIG. 1B shows a table of expenses for a company B. The structure of the table is similar as for company A. That is, company B has the same parent accounts and mostly the same sub accounts and sub sub accounts as has company A.

Embodiments disclosed herein may aggregate the data of company A and company B as shown in FIG. 1C. The structure of the aggregate table shown in FIG. 1C has the same structure as the structure of the table of FIG. 1A and the table of FIG. 1B. However, the amount in a particular row and column of the table of FIG. 1C is the sum of the amounts in the corresponding row and column of FIG. 1A and FIG. 1B. The manner in which this aggregation is achieved is described below.

FIG. 2A depicts a network and server for aggregating QB data from computers of companies and sub companies. The elements of the network may be connected by a local area network or a wide area network such as the Internet. A virtual or real central location 102, or a distributed network of locations, may be created to operate, and supervise the use of, the processing mechanisms described herein. The central location 102 has access to the QB files of a plurality of companies 120, 140, 160, and the affiliate or child companies of these companies 142, 144, 162, and 164.

Thus, for example, the central location may be at an accounting firm with a great number of client companies, each company having at least one QB file. The company 120, for example, may be a florist shop. The parent business 140 may be a mobile phone store with a south store 142 and a north store 144, where the north and south stores may be located at different locations within a city or state. The parent business 160 may be a law firm with its principal office in New York, and with offices in Chicago, 162, and in Atlanta, 164.

Note that in the case of related businesses 140, 142, and 144, each business' respective QB file is located at the same location as the business. In contrast, in the case of the related businesses 160, 162, and 164, each business' respective QB file is located at a central location at business site 160. Note also, that the QB files of business 120 are located offsite. Virtually any business, having virtually any complex relationships of its sub businesses, may use separate instances of QB at the respective locations of the businesses and sub businesses.

In one embodiment, the central location 102 may access the QB files from these businesses and sub businesses and store them in a database of QB files 104. A contributor 106 may have access to the system only to the extent necessary to maintain the system. A network administrator 108 may set passwords, control access to the system, and perform other administrative functions. For example, the network administrator 108 may grant viewing access to a client viewer 110, enabling the viewer 110 to view aggregated QB data. To enable access to the data, a graphical user interface and a keyboard and a mouse may be provided, as is known in the art.

In one embodiment, QB data is obtained from the plurality of companies, 120, 140, 142, 144, 160, 162, and 164, by at least one server 1000 via a QB synchronization application 1002. The server 1000 may be located at any location connected to the network. In particular, the server 1000 may be located at the central location 102 or at a separate location. The QB synch application 1002 may be downloaded over the network to the business locations where the QB files are located. Thus, for example, the QB synch application 1002 may be downloaded to locations 104, 140 142, 144, and 160, as well as to the central location 102. The synchronization application 1002 may reside at the local QB file locations 104, 140 142, 144, and 160, and may operate to upload transactional data from the QB files at the locations 104, 140 142, 144, and 160. The upload of transactional data may be scheduled by an administrator to occur as often as desired, for example, daily, or the upload can occur upon entry of a command by the administrator.

Figure 2B:
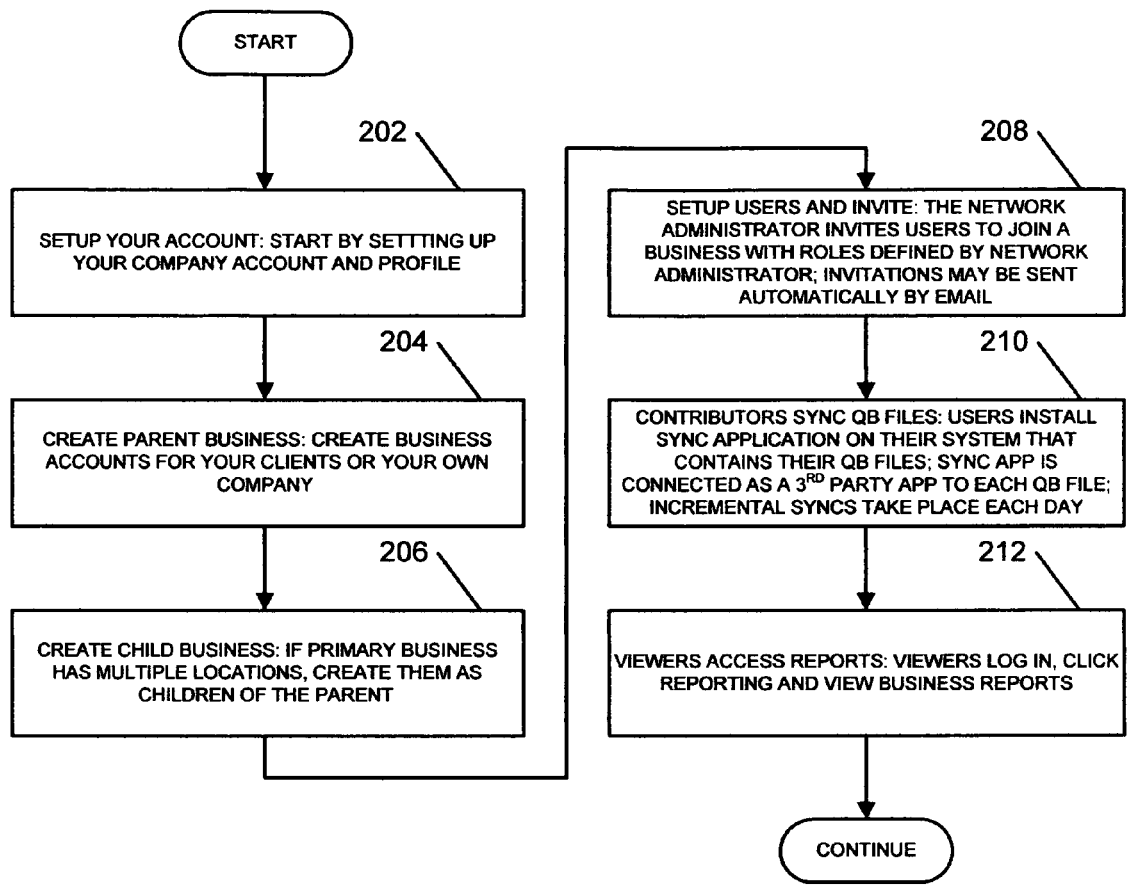
FIG. 2B depicts a flow chart for setting up QB relationships.

FIG. 2B depicts a flow chart for setting up QB relationships for uploading QB files to a central location and aggregating data from a plurality of QB files of client companies and sub companies. First, an administrator of accounts will set up an account and company profile, at 202. Then, the administrator may create a parent business or client account, at 204. Once a parent client is created, the administrator may create sub businesses or sub clients of the parent client, at 206.

The administrator may then authorize certain contributors to have access to the system, at 208. An authorized contributor may install a QB synchronization application at a local computer, at 210. The QB synchronization application interfaces with the local QB files of transaction data, and transmits the data from such files to the central location. Once synchronization takes place, authorized viewers may compile and review business reports that reflect data aggregated from QB files of different locations and companies, at 212.

FIG. 3 shows a table of data acquired from the files of data for company A shown in FIG. 1A and for company B as shown in FIG. 1B, using Structured Query Language (SQL). Acquiring data using SQL is time consuming and complex SQL commands are required to acquire the desired data in a desired form.

FIG. 4 depicts a table of parent accounts extracted from the data associated with company A and company B. A list of parent accounts from the different QB files is acquired using, for example, an SQL command or command in C, C++, or C# or other known programming language. Each parent account is associated with an account identification (ID). As will be discussed above, an account ID serves as a key to a hash table.

FIG. 5 depicts a collection of hash tables and their collection of sub accounts, each key in the hash table is an account ID for the data from companies A and B. Each hash table entry corresponds to a different parent account or sub account. For example, referring to FIG. 4, a first parent account named hotel is from company A and has an account ID of 1. A second parent account named hotel is from company B and has an account ID of 2. Thus, like-named parent accounts are initially assigned different account IDs. In FIG. 5, the collection for account ID 1 (key=1) has a row for each of the two sub accounts of the parent account, Hotel, of company A. Each sub account of this table is assigned a unique account ID. The collection for account ID 2 (key=2) has a row for each of the two sub accounts of the parent account, Hotel, of company B. Each sub account of this collection is assigned a unique account ID.

Further, an entry in the hash table is created for each sub account's sub accounts. The key of a sub account's collection of sub accounts is the account ID of the sub account, as shown in the table of key=1 and the table of key=2. For example, the table of key=5 is the table of the sub account named Motel 6 from the table of key=1. The entry of key=5 has a row for each sub sub account (Dallas and Houston) of the sub account named Motel 6 of account ID=5. The entry of key=6 is the collection of the sub accounts of the parent named Motel 6 from the entry of key=2. And so forth. Note that there is no entry with key=3, for example, because the subaccount named Hyatt of the table of key=1 has no sub sub accounts.

Not shown in FIG. 5 are the columns of data extracted from the columns of the Tables of data from company A (FIG. 1A) and company B (FIG. 1B). An actual hash table will have an entry for each such column.

One embodiment, therefore, is a QB data aggregation system, having a web server connected to a network of computers having QB files. The QB files are stored in a database format at each computer. The web server has memory to store data obtained from the QB files. The web server also has a processor configured to process and aggregate the data of the various QB files. The processor is configured to identify like-named parent accounts of data from each computer. For each like-named parent account, the data of sub accounts of the parent accounts is aggregated. The aggregated data is stored in a hash table from which a report may be created to display the data according to parent account and sub account. Each entry of the hash table corresponds to data of a different-named parent account. An entry has a collection of rows for each sub account of a parent account, and has columns of aggregated data associated with each sub account. Each column may correspond to data associated with a time frame, for example, monthly data. The data may be an aggregate profit and loss table, for example, showing the aggregate profit and loss data for a plurality of companies. As another example, the aggregate data may be presented in a chart of accounts.

Figure 6:
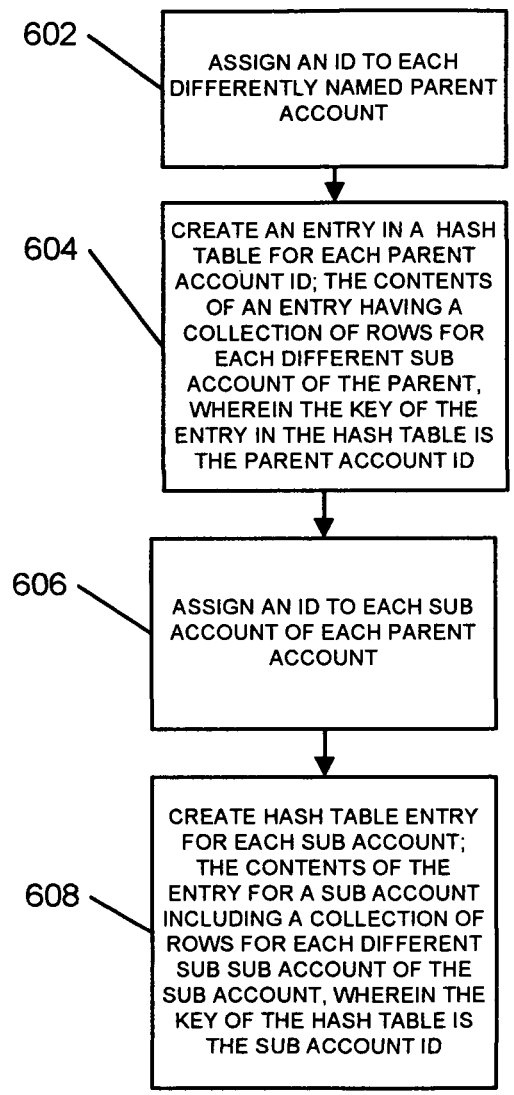
FIG. 6 depicts a flow chart for assigning IDs and creating hash tables.

FIG. 6 depicts a flow chart for assigning IDs and creating hash tables. At 602, the system assigns an ID to each differently-named parent account. An entry in the hash table is created for each parent account ID, at 604. The contents of an entry has a collection of rows for each different sub account of the parent. The key of the entry is the parent account ID. IDs are also assigned to each sub account of a parent account, at 606. An entry in the hash table is created for each sub account ID, at 608, Each entry in a hash table for a sub account is a collection of rows which represent a different sub sub account of the sub account to which the collection is associated.

Figure 7:
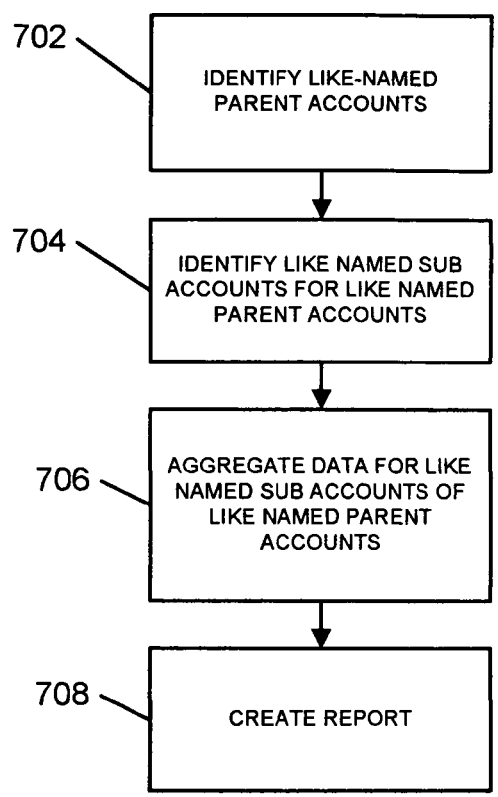
FIG. 7 depicts a flow chart for identifying and aggregating data of like-named accounts.

FIG. 7 depicts a flow chart for identifying and aggregating data of like-named accounts. At 702, like named parent accounts are identified. At 704, for each like-named parent account, like-named sub accounts of the like-named parent accounts are identified. At 706, data for each like-named sub account of each like-named parent account are aggregated. At 708 a report, such as the table of FIG. 1C, is created upon request by an authorized contributor or the system administrator.

An example of pseudo code for implementing the methods described herein is as follows:

```
For every account returned:
    If account is top-level parent, place in a separate collection
    Otherwise, place in the collection stored in the hash table at key of
    parent account ID
For every parent in result:
    For every other parent in result:
        If name matches, combine parent accounts
For every parent account that was combined:
    Get collection of children from hash table
    For every child of this parent:
        For every other child of this parent:
            If name matches, combine child accounts
```

The first loop, in C#, is a quick process because the loop does not perform a comparison of account IDs. Rather, the loop merely retrieves each account and checks if an account ID exists or not, which does not require subtraction. The subsequent loops in C# compares accounts against a sub set of accounts that only match parents. Only children that belong to parents that were combined will be compared. This is because if the parent accounts did not match, then children accounts will not match. This drastically reduces the number of comparisons that are required to aggregate the data. In contrast, using SQL requires a collection for every parent account, rather than merely every differently-named parent account. That is, even with the bulk operations that SQL can perform for locating matching children, it cannot perform bulk operations needed to recursively aggregate matching children; for this, CPU intensive custom looping would need to be performed. A reason that using C# is faster is that fewer comparisons need be made.

Another illustrative embodiment includes a machine-readable medium embodying machine-readable instructions that, when executed by a processor, cause the processor to obtain data from each of a plurality of computers in a network, the data being organized into one or more parent accounts. The processor is further caused by the instructions to aggregate the data from like-named parent accounts. The processor may further be caused to form a hash table with entries being a collection of sub accounts for each differently-named parent account, the collection including aggregate data associated with the parent account name In some embodiments, the processor is further caused to obtain data from each of the plurality of computers in the network, the data being organized into one or more sub accounts. The processor may further aggregate data of one or more like-named sub accounts of like-named parent accounts. The processor may also form an entry in the hash table for each differently-named sub account, the entry including aggregate data associated with the sub account name. An item in the collection is a row that has data associated with a sub sub account name. The process may continue further in like manner for sub sub accounts, and so forth.

Various changes, substitutions and alterations can be made to the embodiments described herein without departing from the scope of the appended claims. An embodiment may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from this disclosure that processes, machines, manufacture, compositions of matter, means, methods, or steps, presently existing or later to be developed are equivalent to, and fall within the scope of what is claimed. Accordingly, the appended claims are intended to include within their scope such processes, machines, manufacture, compositions of matter, means, methods, or steps.

What is claimed is:

1. A method of aggregating data in a computerized apparatus, the method comprising:

obtaining a plurality of accounting records from a plurality of physical locations;

storing the plurality of accounting records in a database associated with the computerized apparatus;

extracting the plurality of accounting records from the database, each of the accounting records comprising an account identifier, an account name, and a parent account identifier, the parent account identifier comprising either: a top level account identifier, or a non-top level account identifier;

for each of the plurality of accounting records, assigning that accounting record in the computerized apparatus as a top-level parent accounting record in a hierarchical structure when that accounting record comprises the top level account identifier, otherwise placing that accounting record into a data structure associated with the computerized apparatus;

combining those top-level parent accounting records that share a common name using the computerized apparatus;

for each of the plurality of accounting records placed into the data structure, when the parent account identifier associated with each accounting record matches the account identifier of the top-level parent accounting record, combining that accounting record into the hierarchical structure with its associated top-level parent accounting record using the computerized apparatus, otherwise leaving that accounting record in the data structure;

for each of the plurality of accounting records whose parent account identifier does not match the account identifier of the top-level parent accounting record, combining that accounting record into the hierarchical structure when the parent account identifier for that accounting record matches the account identifier of an accounting record that has already been placed into the hierarchical structure using the computerized apparatus, otherwise leaving that accounting record in the data structure;

repeating the act of combining the accounting record into the hierarchical structure using the computerized apparatus until no accounting records exist in the data structure; and generating a report using the computerized apparatus based at least on the hierarchical structure created.

2. The method of claim 1, wherein the combining of that accounting record into the hierarchical structure is accomplished via a recursive aggregation.

3. The method of claim 1, wherein a determination of whether the parent account identifier associated with each account record matches the account identifier of the top-level parent accounting record occurs via a general purpose programming language rather than a query language.

4. The method of claim 3, wherein the extracting the plurality of accounting records from the database occurs via the query language.

5. The method of claim 1, further comprising prior to generating the report, verifying authorization of a user to generate the report.

6. The method of claim 1, wherein the obtaining of the plurality of accounting records from the plurality of physical locations comprises synchronizing the plurality of accounting records between a central location and the plurality of physical locations.

7. Computerized apparatus comprising a non-transient storage medium having a plurality of computer readable instructions disposed thereon, the instructions configured to, when executed:

obtain a plurality of accounting records from a plurality of physical locations;

store the plurality of accounting records in a database associated with the computerized apparatus;

extract the plurality of accounting records from the database, each of the accounting records comprising an account identifier, an account name, and a parent account identifier, the parent account identifier comprising either: a top level account identifier, or a non-top level account identifier;

for each of the plurality of accounting records, assign that accounting record in the computerized apparatus as a top-level parent accounting record in a hierarchical structure when that accounting record comprises the top level account identifier, otherwise place that accounting record into a data structure associated with the computerized apparatus;

combine those top-level parent accounting records that share a common name using the computerized apparatus;

for each of the plurality of accounting records placed into the data structure, when the parent account identifier associated with each accounting record matches the account identifier of the top-level parent accounting record, combine that accounting record into the hierarchical structure with its associated top-level parent accounting record using the computerized apparatus, otherwise leaving that accounting record in the data structure;

for each of the plurality of accounting records whose parent account identifier does not match the account identifier of the top-level parent accounting record, combine that accounting record into the hierarchical structure when the parent account identifier for that accounting record matches the account identifier of an accounting record that has already been placed into the hierarchical structure using the computerized apparatus, otherwise leave that accounting record in the data structure;

repeat the combination of the accounting record into the hierarchical structure until no accounting records exist in the data structure; and generate a report using the computerized apparatus based at least on the hierarchical structure created.

8. The computerized apparatus of claim 7, wherein plurality of accounting records are stored in a plurality of QuickBooks files.

9. The computerized apparatus of claim 7, wherein the instructions that make a determination of whether the parent account identifier associated with each account record matches the account identifier of the top-level parent accounting record occurs via a general purpose programming language rather than a query language.

10. The computerized apparatus of claim 7, wherein the instructions are further configured to, when executed:

synchronize the plurality of accounting records between a central location and the plurality of physical locations.

11. The computerized apparatus of claim 7, wherein placement of accounting records into the data structure comprises creation of a hash table entry for each accounting record that comprises a non-top level account identifier, each hash table entry accessible via a key, the key comprising the parent account identifier of the accounting record.

* * * * *